(12) United States Patent
Nemoto (10) Patent No.: US 8,079,839 B2
(45) Date of Patent: Dec. 20, 2011

(54) BLADDER FOR VULCANIZATION OF TIRES, METHOD FOR VULCANIZATION OF TIRES, AND A PNEUMATIC TIRE

(75) Inventor: Masayuki Nemoto, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 55 days.

(21) Appl. No.: 12/808,600

(22) PCT Filed: Dec. 10, 2008

(86) PCT No.: PCT/JP2008/072384
§ 371 (c)(1),
(2), (4) Date: Jun. 16, 2010

(87) PCT Pub. No.: WO2009/078317
PCT Pub. Date: Jun. 25, 2009

(65) Prior Publication Data
US 2011/0120612 A1    May 26, 2011

(30) Foreign Application Priority Data
Dec. 17, 2007   (JP) ................................ 2007-324671

(51) Int. Cl.
B29C 33/10    (2006.01)
B29C 35/02    (2006.01)

(52) U.S. Cl. ........................... 425/52; 425/812; 264/315

(58) Field of Classification Search .................... 425/43, 425/52, 812; 264/315, 326
See application file for complete search history.

(56) References Cited

U.S. PATENT DOCUMENTS

| 2,678,468 | A | * | 5/1954 | Smith | 425/53 |
|---|---|---|---|---|---|
| 2,790,205 | A | * | 4/1957 | Parker | 425/52 |
| 2,851,729 | A | * | 9/1958 | Kalkofen | 425/53 |
| 3,170,195 | A | * | 2/1965 | Knox | 425/812 |
| 3,676,028 | A | * | 7/1972 | Christie et al. | 425/52 |
| 3,970,416 | A | * | 7/1976 | Mattson | 425/52 |
| 3,989,429 | A | * | 11/1976 | Mattson | 425/52 |
| 4,082,490 | A | * | 4/1978 | Chateau | 425/52 |
| 4,293,293 | A | * | 10/1981 | MacMillan | 425/52 |
| 5,062,781 | A | * | 11/1991 | Szyms et al. | 425/52 |
| 5,851,323 | A | * | 12/1998 | Kaido et al. | 152/510 |
| 7,681,613 | B2 | * | 3/2010 | Yukawa et al. | 152/450 |

FOREIGN PATENT DOCUMENTS

| JP | 2002-137227 | 5/2002 |
|---|---|---|
| JP | 2007-083656 | 4/2007 |
| JP | 2008-012751 | 1/2008 |
| JP | 2008-126509 | 6/2008 |

* cited by examiner

Primary Examiner — James Mackey
(74) Attorney, Agent, or Firm — Greer, Burns & Crain, Ltd.

(57) ABSTRACT

The bladder for vulcanizing tires having a plurality of first air-release grooves provided on the outer surface of a bladder body and each formed so as to extend from one to the other of the tire circumferential direction and extend toward one side of the tire-width direction, and a plurality of second air-release grooves provided on the outer surface of a bladder body and each formed so as to extend from one to the other of the tire circumferential direction and extend toward the other side of the tire-width direction. By this, the outer surface of the bladder body is divided into a plurality of areas by each of the air-release grooves. Also, the vertexes of each of the areas are angular toward the tire-circumferential direction. Therefore, the pressure contact between each of the areas and the inner surface of the tire is easily released starting at the said vertexes of each of the areas as release starting points.

7 Claims, 9 Drawing Sheets

One side of
the tire-width direction

The other side of the tire-circumferential direction ← → One side of the tire-circumferential direction The other side of
the tire-width direction

|  | Comparison example 1 | Comparison example 2 | Comparison example 3 | Comparison example 4 | Execution example 1 | Execution example 2 | Execution example 3 | Execution example 4 |
|---|---|---|---|---|---|---|---|---|
| Applying release agent | YES | NO | NO | NO | NO | NO | NO | NO |
| Existence of second air-release grooves | NO | NO | YES | YES | YES | YES | YES | YES |
| Second predetermined interval / fist predetermined interval | — | — | 1.0 | 5.0 | 1.2 | 2.0 | 3.0 | 4.5 |
| Occurrence of vulcanization failure | NO | YES | NO | YES | NO | NO | NO | NO |
| Thickness of inner liner [mm] | 1.0 | 1.0 | 0.8 | 1.0 | 1.0 | 1.0 | 1.0 | 1.0 |
| Internal pressure holding ability | 100 | 95 | 95 | 95 | 102 | 105 | 102 | 102 |

| | Comparison example 1 | Comparison example 2 | Execution example 2 | Execution example 5 | Execution example 6 |
|---|---|---|---|---|---|
| Applying release agent | YES | NO | NO | NO | NO |
| Existence of second air-release grooves | NO | NO | YES | YES | YES |
| Second predetermined interval / fist predetermined interval | — | — | 2.0 | 2.0 | 2.0 |
| Existence of supplemental grooves | NO | NO | NO | YES | NO |
| Existence of recess portions | NO | NO | NO | NO | YES |
| Occurrence of vulcanization failure | NO | YES | NO | NO | NO |
| Thickness of inner liner [mm] | 1.0 | 1.0 | 1.0 | 1.0 | 1.0 |
| Internal pressure holding ability | 100 | 95 | 105 | 107 | 107 |

ized tire into the vulcanizing mold and disposing the bladder
BLADDER FOR VULCANIZATION OF TIRES, METHOD FOR VULCANIZATION OF TIRES, AND A PNEUMATIC TIRE This application is a U.S. National Phase under 35 U.S.C. §371 of International Application No. PCT/JP2008/072384, filed Dec. 10, 2008.

TECHNICAL FIELD

The present invention relates to a bladder for vulcanization of tires which is used in tire manufacturing, method for vulcanization of pneumatic tires for automobiles, and a pneumatic tire for automobiles, for example.

BACKGROUND ART

A conventional bladder has a flexible bladder body disposed inside an unvulcanized tire which is placed inside a vulcanizing mold and expands so that the unvulcanized tire becomes pressure contact with the inner surface of the vulcanizing mold. The outer peripheral surface of the bladder body is provided with a plurality of air release grooves so that the remaining air between the outer surface of the bladder body and the inner surface of the tire can be discharged.
Patent Document 1: Japanese Patent publication No. 2007-83656

DISCLOSURE OF THE INVENTION

Problem to be Solved by the Invention

By the way, vulcanization of tires using said bladder for vulcanizing tires includes a step of coating the outer surface of the bladder or the inner surface of the unvulcanized tire with a liquid release agent, a step of inserting the unvulcanized tire into the vulcanizing mold and disposing the bladder body inside the unvulcanized tire, a step of deflating the bladder body, taking out the bladder body from the vulcanized tire, and taking out the vulcanized tier from the vulcanizing mold after inflating the bladder body so that the unvulcanized tire becomes pressure contact with the inner surface of the vulcanizing mold for a predetermined period.

In this case, at the time of the vulcanization, the outer surface of the bladder is brought into contact with the inner surface of the unvulcanized tire by large amount of power. Also, the inner surface of the unvulcanized tire is made from a rubber material having low air permeability such as butyl rubber. Therefore, the outer surface of the bladder body and the inner surface of the vulcanized tire are easily adhered with each other, so the release agent is applied to either the outer surface of the bladder body or the inner surface of the unvulcanized tire. Thus, since a device or a step of applying the release agent for applying the release agent to all over the bladder body or the unvulcanized tire becomes necessary, it is not preferable for reducing the manufacturing costs.

Also, reducing the amount of the release agent or omitting the step of applying the release agent may cause adhesion between a part of the inner surface of the vulcanized tire and the outer surface of the bladder body. Also, in this situation, when the bladder body is deflated and the bladder body is taken out from the vulcanized tire, a part of the inner surface of the vulcanized tire remains adhered on the bladder body side, and the quality of the tire becomes low.

An object of the present invention is to provide a pneumatic tier for automobiles, a bladder for vulcanization of tires, and method for vulcanization of pneumatic tires capable of reducing the amount of the release agent applied to either the outer surface of the bladder body or the inner surface of the unvulcanized tire, or capable of omitting the step of applying the release agent without lowering the quality of tires.

Means for Solving the Problem

To achieve the above object, in the present invention, a bladder for vulcanization of tires having a bladder body made from a flexible material, the bladder body which is disposed inside an unvulcanized tire in a vulcanizing mold during vulcanization and expands so that the unvulcanized tire becomes pressure contact with the inner surface of the vulcanizing mold, a plurality of first air-release grooves provided on the outer surface of the bladder body and arranged with first predetermined intervals with each other in the tire-circumferential direction, each of the first air-release grooves formed so as to extend from one to the other of the tire circumferential direction and extend toward one side of the tire-width direction, and a plurality of second air-release grooves provided on the outer surface of the bladder body and arranged with second predetermined intervals with each other in the tire-circumferential direction, the second interval is a distance equal to or more than 1.2 times and equal to or less than 4.5 times relative to the first interval, each of the second air-release grooves formed so as to extend from one to the other of the tire circumferential direction and extend toward the other side of the tire-width direction, each of the second air-release grooves intersecting two or more first air-release grooves.

Therefore, on the outer surface of the bladder body, there are first air-release grooves formed so as to extend from a tire-circumferential position to another tire-circumferential position and extend toward one side of the tire-width direction, and the second air-release grooves formed so as to extend from a tire-circumferential position to another tire-circumferential position and extend toward the other side of the tire-width direction. Also, each of the second air-release grooves is intersecting two or more first air-release grooves. By this, the outer surface of the bladder body is divided into a plurality of areas by each of the air-release grooves. Thus, in the case in which the outer surface of the bladder body comes into pressure contact with the inner surface of the tire during vulcanization, said areas come into pressure contact with the inner surface of the tire. Also, since the vertexes of each of the areas which are formed by intersecting the first air-release grooves and the second air-release grooves are angular toward the tire-circumferential direction, the pressure contact between each of the areas and the inner surface of the tire is easily released starting at the said vertexes as release starting points.

Also, if the second interval is a distance equal to or less than 4.5 times relative to the first interval, the pressure contact between each of the areas and the inner surface of the tire is easily released from the said vertexes as release starting points. Moreover, if the second interval is a distance equal to or more than 1.2 times relative to the first interval, it is possible to prevent a reduction of the thickness of inner liner of the vulcanized tire.

Moreover, in the present invention, when a pneumatic tire is formed by vulcanizing an unvulcanized tire, the said unvulcanized tire is inserted in the vulcanizing mold, and the bladder body of the said bladder for vulcanization of tires is disposed inside the unvulcanized tire. Also, the bladder body is inflated so that the unvulcanized tire becomes pressure contact with the inner surface of the vulcanizing mold. By this, the unvulcanized tire is vulcanized.

Also, a pneumatic tire of the present invention is formed by vulcanizing an unvulcanized tire using the said bladder for vulcanizing tires. By this, unvulcanized rubber constituting the unvulcanized tire flows into each of the air-release grooves on the outer surface of the bladder during vulcanization, and convex portion corresponding to each of the air-release grooves is formed on the inner surface of the tire.

On the outer surface of the bladder body, there are first air-release grooves formed so as to extend from a tire-circumferential position to another tire-circumferential position and extend toward one side in the tire-width direction, and the second air-release grooves formed so as to extend from a tire-circumferential position to another tire-circumferential position and extend toward the other side of the tire-width direction. Also, each of the second air-release grooves is intersecting two or more first air-release grooves. By this, the outer surface of the bladder body is divided into a plurality of areas by each of the air-release grooves. Thus, in the case in which the outer surface of the bladder body comes into pressure contact with the inner surface of the tire during vulcanization, said areas come into pressure contact with the inner surface of the tire. Also, since the vertexes of each of the areas which are formed by intersecting the first air-release grooves and the second air-release grooves are angular toward the tire-circumferential direction, the pressure contact between each of the areas and the inner surface of the tire is easily released from the said vertexes as release starting points.

Also, if the second interval is a distance equal to or less than 4.5 times relative to the first interval, the pressure contact between each of the areas and the inner surface of the tire is easily released from the said vertexes as release starting points. Moreover, if the second interval is a distance equal to or more than 1.2 times relative to the first interval, it is possible to prevent a reduction of the thickness of inner liner of the vulcanized tire.

Effect of the Invention

According to this invention, in the case in which the outer surface of the bladder body comes into pressure contact with the inner surface of the tire during vulcanization, said areas come into pressure contact with the inner surface of the tire. Also, the pressure contact between each of the areas and the inner surface of the tire is easily released from the said vertexes as release starting points. By this, when the bladder body is taken out from the vulcanized tire, adhesion between the inner surface of the vulcanized tier and the outer surface of the bladder body is prevented. Therefore, it is possible to reduce the amount of the release agent applied to either the outer surface of the bladder body or the inner surface of the unvulcanized tire, or to omit the step of applying the release agent without lowering the quality of tires.

The above and other objects, features, and advantages of the present invention will become more apparent from the following description and the accompanying drawings.

DESCRIPTION OF SYMBOLS

1 ... vulcanizing mold, 10 ... upper mold, 20 ... lower mold, 30 ... middle mold, 40 ... bead ring, 50 ... bladder for vulcanizing tires, 51 ... support member, 52 ... bladder body, 52a ... first air-release groove, 52b ... second air-release groove, 53 ... connecting mechanism, 60 ... supplemental groove, 61 ... supplemental groove, 62 ... supplemental groove, 63 ... supplemental groove, 64 ... concave portion, T ... unvulcanized tire, EL ... equator line, DV ... area, NDB ... open area.

BEST MODE FOR CARRYING OUT THE INVENTION

Figure 1:
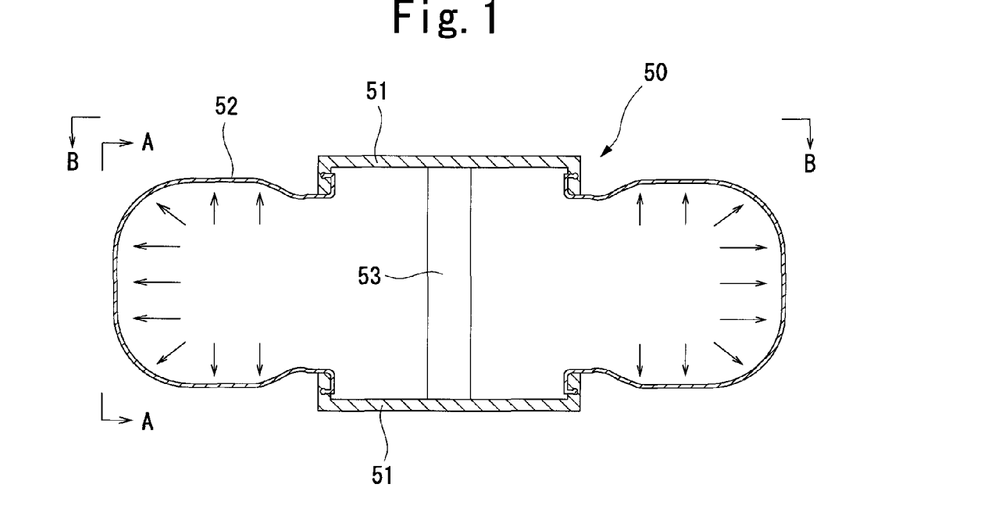
FIG. 1 is a side sectional view of a bladder for vulcanizing tires with a bladder body at an inflated state, and showing a first embodiment of the present invention.
Figure 2:
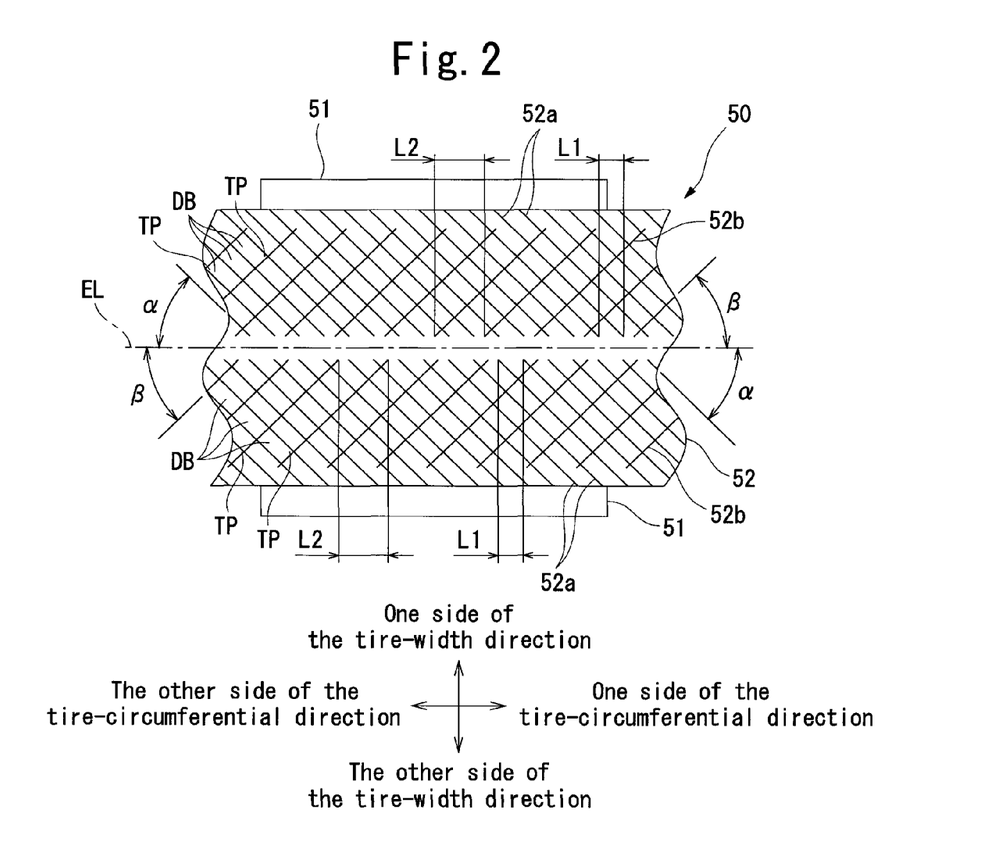
FIG. 2 is an A direction view of FIG. 1.
Figure 3:
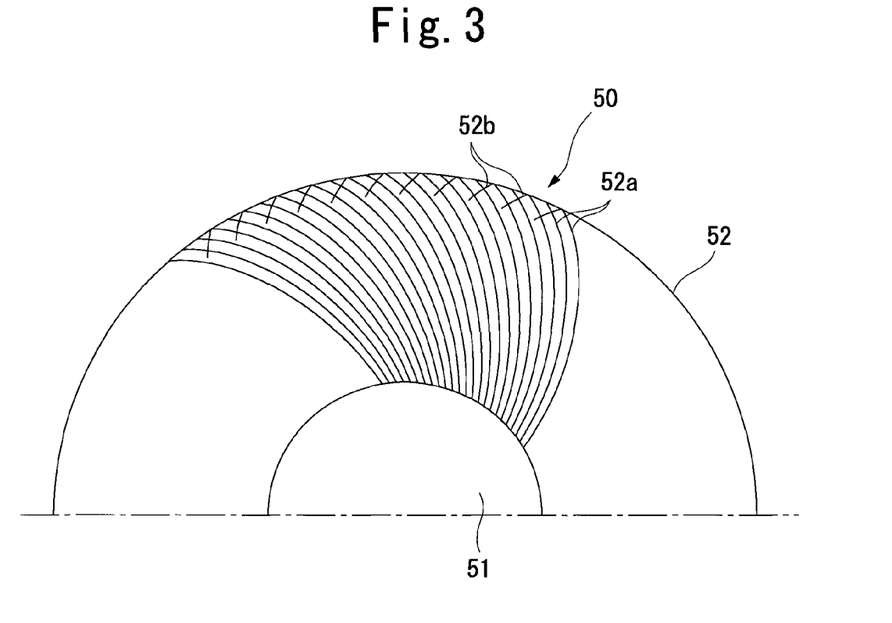
FIG. 3 is a B direction view of FIG. 1.
Figure 4:
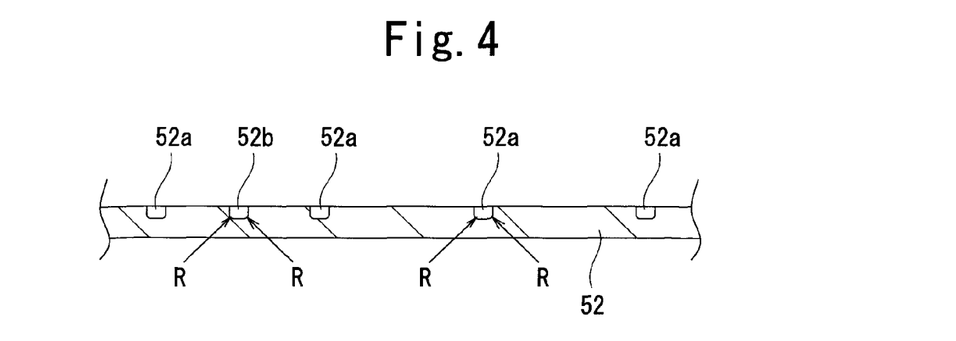
FIG. 4 is a partial sectional view of the bladder body.
Figure 5:
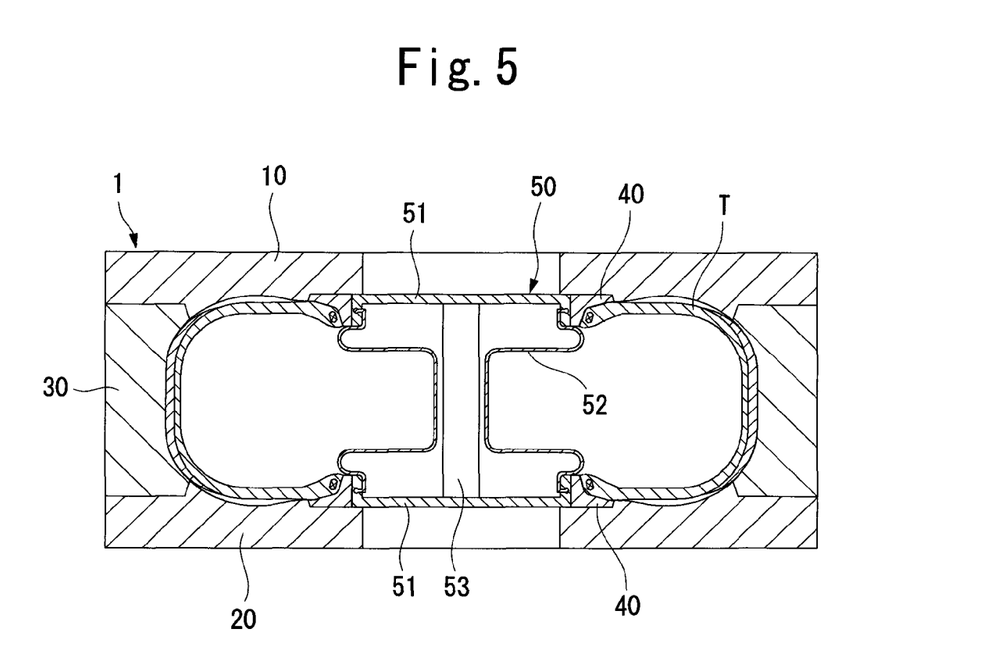
FIG. 5 is side sectional views of a vulcanizing mold, a bladder for vulcanizing tires, and an unvulcanized tire.
Figure 6:
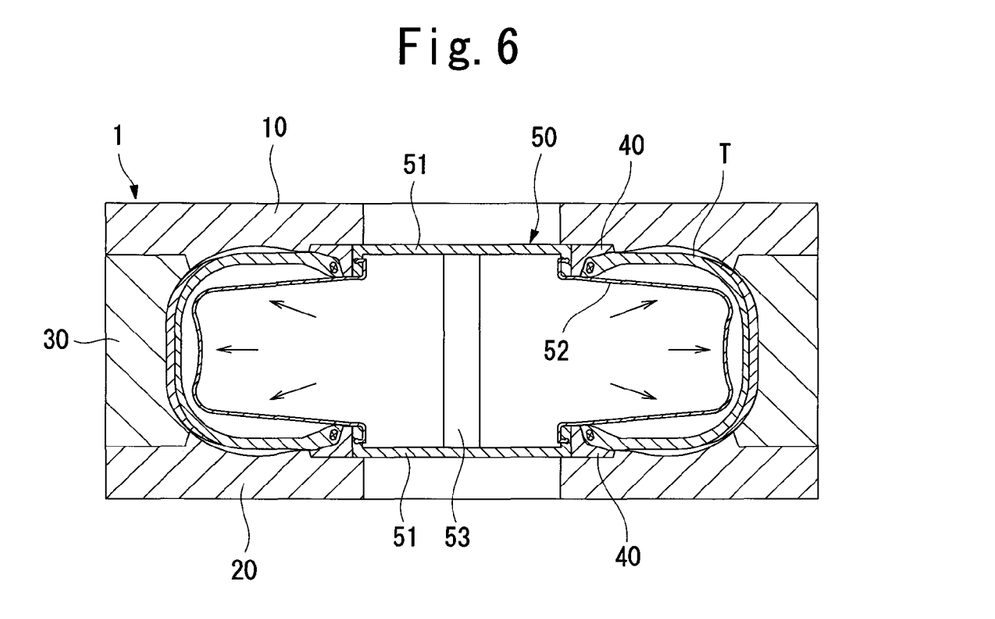
FIG. 6 is side sectional views of the vulcanizing mold, the bladder for vulcanizing tires, and the unvulcanized tire.
Figure 7:
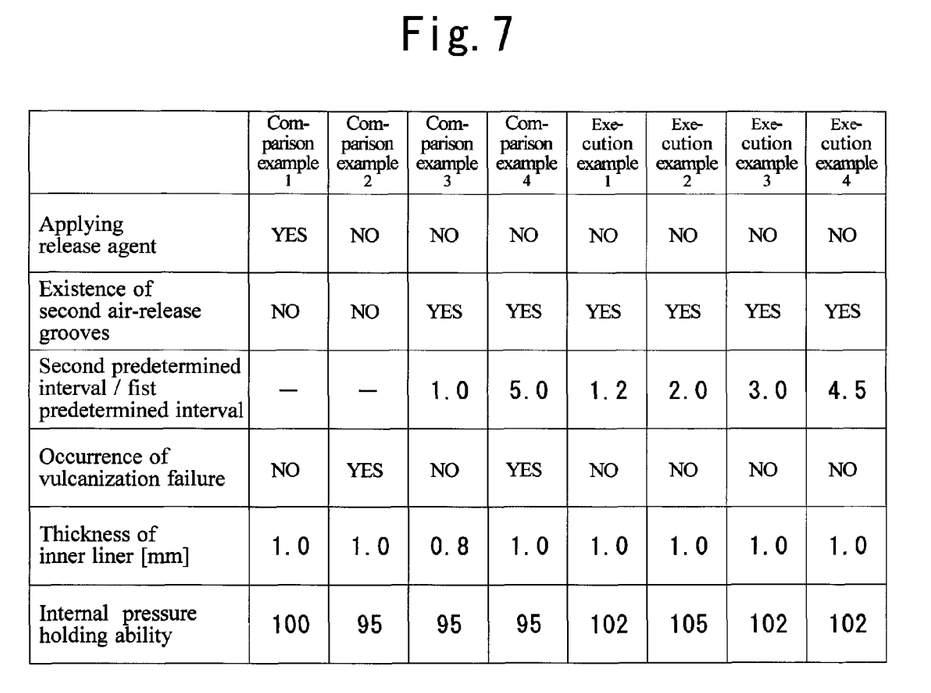
FIG. 7 is a table showing an experiment result.

FIGS. 1 to 7 show a first embodiment of the present invention. FIG. 1 is a side sectional view of a bladder for vulcanizing tires with a bladder body at an inflated state, FIG. 2 is an A direction view of FIG. 1, FIG. 3 is a B direction view of FIG. 1, FIG. 4 is a partial sectional view of the bladder body, FIGS. 5 and 6 are side sectional views of a vulcanizing mold, a bladder for vulcanizing tires, and an unvulcanized tire, FIG. 7 is a table showing an experiment result.

This bladder 50 for vulcanizing tires is used at the state being disposed inside a vulcanizing mold 1. The vulcanizing mold 1 has a well known structure comprising a circular and plate like shaped upper mold 10, a circular and plate like shaped upper mold 10 lower mold 20 disposed so as to be opposite to the upper mold 10 in the vertical direction, a middle mold 30 disposed between the upper mold 10 and the lower mold 20, and a pair of bead lings 40 detachably attached to the upper mold 10 and the lower mold 20.

An unvulcanized tire T vulcanized by this embodiment has a well known structure having a inner liner member, sidewall member, carcass member, belt member, breaker member, tread member, bead member, and the like. Also, the unvulcanized tire T becomes a pneumatic tire for automobile by vulcanization.

The upper mold 10 of the vulcanizing mold 1 moves in the vertical direction relative to the lower mold 20 by a moving mechanism (not shown in drawings). Also, the middle mold 30 is divided to several part in the circumferential direction, and the middle mold 30 moves in the vertical direction and radial direction by a moving mechanism (not shown in drawings). Also, the upper, lower and middle molds 10, 20, 30 are heated to a voluntary temperature by a heating apparatus (not shown in drawings). Also, the bead rings 40 are detachably attached to the inner surface side of the upper and lower molds 10, 20.

The bladder 50 for vulcanizing tires having a pair of support members 51 arranged in the vertical direction and formed like a circular and plate like shape, and a bladder body 52 supported by each of the support members 51. The bladder body 52 is made from vulcanized rubber and formed like a cylindrical shape, and has flexibility. An axial direction end of the bladder body 52 is attached to the outer surface side of the upper support member 51, the other axial direction end of the bladder body 52 is attached to the outer surface side of the lower support member 51. In this embodiment, there are not any reinforcement codes in the bladder body 52, it is possible to reinforce whole or part of the bladder body 52 with reinforcement codes. Each support member 52 is connected with each other by a connecting member 53. Also, heated steam is introduced in and discharged from a space which is closed by each of the support member 51 and the bladder body 52, by means of a apparatus for providing heated steam (not shown in drawings). Also, when the heated steam is introduced in the said space, the bladder body 62 becomes inflated into a toroidal shape. It is possible to use an apparatus for providing compressed air instead of the apparatus for providing heated steam, and it is possible to provide into the said space compressed air instead of providing heated steam.

As shown in FIGS. 2 and 3, a plurality of first air-release grooves 52a and a plurality of second air-release grooves 52b are provided on the outer surface of the bladder body 52. In FIG. 3, each of the air-grooves 52a, 52b are provided only on a part of the bladder body in its circumferential direction to simplify the process for drawing up the drawings though, each of the air-grooves 52a, 52b are provided throughout whole circumference of the bladder body actually. Each bottom corner R of each of the air-release grooves 52a, 52b is formed into curved surface so that local stress concentration will not be caused at the bottom corner of each of the air-release grooves 52a, 52b when the bladder body is inflated. Each of the air-release grooves 52a, 52b is formed on the outer surface of the bladder body 52 by forming a plurality of protruding portions, which are corresponding to each of the air-release grooves 52a, 52b, on a surface of a metal mold for vulcanizing the bladder body 52.

The first air-release grooves 52a are arranged with first predetermined intervals L1 with each other in the tire-circumferential direction on the outer surface of the bladder body 52. Each of the first air-release grooves 52a is formed so as to extend from a tire-circumferential position to another tire-circumferential position and extend toward one side of the tire-width direction (refer to FIG. 2). Also, a plurality of first air-release grooves 52a is provided on one tire-width side on the bladder body 52 relative to the equator line EL and another plurality of first air-release grooves 52a is provided on the other tire-width side on the bladder body 52 relative to the equator line EL. Also, each of the first air-release grooves 52a makes a first predetermined angle α relative to the equator line EL near the equator line EL. In this embodiment, the equator line EL is positioned at the center of the width direction of the bladder body 52, and is an imagination line extending toward the tire-circumferential direction. Also, the first air-release grooves 52a are extending from a vicinity of the equator line EL to a vicinity of a portion which is supported by each of the support members 51. Thus, the first air-release grooves 52a are provided throughout an area corresponding to the tread portion, shoulder portion, side portion, and bead portion.

On the other hand, the second air-release grooves 52b are arranged with second predetermined intervals L2 with each other in the tire-circumferential direction on the outer surface of the bladder body 52. Each of the second air-release grooves 52b is formed so as to extend from a tire-circumferential position to another tire-circumferential position and extend toward the other side of the tire-width direction (refer to FIG. 2). Each of the second air-release grooves 52b is intersecting two or more first air-release grooves 52a. Also, a plurality of second air-release grooves 52b is provided on one tire-width side on the bladder body 52 relative to the equator line EL and another plurality of second air-release grooves 52b is provided on the other tire-width side on the bladder body 52 relative to the equator line EL. Also, each of the second air-release grooves 52b makes a second predetermined angle β relative to the equator line EL near the equator line EL. In this embodiment, the said first interval L1 and second interval L2 are intervals near the equator line EL, and the second interval L2 is a double distance of the first interval L1. Also, the second air-release grooves 52b are extending from a vicinity of the equator line EL to a portion which is corresponding to the shoulder portion of the unvulcanized tire T. Thus, the second air-release grooves 52b are provided throughout an area corresponding to the tread portion and shoulder portion.

Each of the air-release grooves 52a, 52b is configured so that its depth is equal to or more than 0.2 mm and equal to or less than 1.2 mm, each of the air-release grooves 52a, 52b is configured so that its width is equal to or more than 0.4 mm and equal to or less than 1.5 mm. If the depth of air-released grooves 52a is less than 0.2 mm or the width of the air-groove 52a is less than 0.4 mm, each of the air-release grooves 52a, 52b does not work efficiently to discharge air between the outer surface of the bladder 52 and the inner surface of the unvulcanized tire T. Also, if the depth of the air-release groove 52a is more than 1.2 mm or the width of the air-release groove 52b is more than 1.5 mm, the amount that the inner liner member of the unvulcanized tire T flows into each of the air-release grooves 52a, 52b gets increased. Thus, it is not preferable for making the thickness of the inner liner member uniformly.

In this embodiment, each of the intervals L1, L2, each of the predetermined angles α, β, the equator line EL, the depth, the width, and the like are the interval, angle and dimension of a case in which the bladder body 52 is inflated. Also, each of the air-release grooves 52a, 52b can be straight line shape or curved line shape which is gradually curving.

When the unvulcanized tire T is vulcanized by the vulcanizing mold 1 and bladder 50 for vulcanizing tires having the aforementioned structure, firstly, the upper mold 10 is moved upward relative to the lower mold 20, and the middle mold 20 is moved toward the upper, radial-outside direction. Also, the unvulcanized tire T is placed onto the lower mold 20, and the bladder 50 for vulcanizing tires is disposed at the radial inside of the unvulcanized tire T. And then, the upper mold 10 is moved downwardly, the middle mold 30 is moved toward the lower, radial-inside direction. By this, the unvulcanized tire T is disposed inside the vulcanizing mold 1, and the bladder 50 for vulcanizing tires is disposed at the radial inside of the unvulcanized tire T (refer to FIG. 5).

Next, heated steam is introduced into a space of the bladder 50 closed by each of the support members 51 and the bladder body 52 of the bladder 50 for vulcanizing tires. By this, the bladder body 52 starts being inflated, and the bladder body 52 is disposed inside the unvulcanized tire T (refer to FIG. 6). Heated steam is further introduced into the bladder body 52, the outer surface of the bladder body 52 comes into contact with the inner surface of the unvulcanized tire T, and the inflation of the bladder body 52 makes the unvulcanized tire T becomes pressure contact with the inner surface of the vulcanizing mold 1. By this, the unvulcanized tire T is formed into a predetermined profile by the outer surface of the bladder body 52 and the inner surface of the vulcanizing mold 1, and the unvulcanized tire T is vulcanized by the heat of the vulcanizing mold 1 and heated steam.

Next, when a predetermined period has passed at the aforementioned situation, heated steam is discharged from the closed space and the bladder body 52 becomes deflated. Also, the upper mold 10 is moved upward relative to the lower mold 20, and the middle mold 30 is moved toward the upper, radial-outside direction. Also, the bladder 50 for vulcanizing tires is taken out from the vulcanized tire, and the vulcanized tire is taken out from the vulcanizing mold 1.

In this embodiment, on the outer surface of the bladder body 52, there are first air-release grooves 52a formed so as to extend from a tire-circumferential position to another tire-circumferential position and extend toward one side of the tire-width direction, and the second air-release grooves 52b formed so as to extend from a tire-circumferential position to another tire-circumferential position and extend toward the other side of the tire-width direction. Also, each of the second air-release grooves 52b is intersecting two or more first air-release grooves 52a. By this, the outer surface of the bladder body 52 is divided into a plurality of areas DB by each of the air-release grooves 52a, 52b (refer to FIG. 2). Thus, in the case in which the outer surface of the bladder body 52 comes into pressure contact with the inner surface of the tire during vulcanization, said areas DB come into pressure contact with the inner surface of the tire. Also, the vertexes TP of each of the areas which are formed by intersecting the first air-release grooves 52a and the second air-release grooves 52b become angular toward the tire-circumferential direction. Therefore, the pressure contact between each of the areas DB and the inner surface of the tire is easily released starting at the said vertex TP, which works as release starting points, of each of the areas DB.

According to this embodiment, in the case in which the outer surface of the bladder body 52 comes into pressure contact with the inner surface of the tire during vulcanization, said areas DB come into pressure contact with the inner surface of the tire. Also, the pressure contact between each of the areas DB and the inner surface of the tire is easily released at the said vertex TP, which works as release starting point, of each of the areas DB. By this, when the bladder body 52 is taken out from the vulcanized tire, adhesion between the inner surface of the vulcanized tier and the outer surface of the bladder body 52 is prevented. Therefore, it is possible to reduce the amount of the release agent applied to either the outer surface of the bladder body 52 or the inner surface of the unvulcanized tire T, or to omit the step of applying the release agent without lowering the quality of tires. In this embodiment, the step of applying the release agent is omitted. On the other hand, if it is necessary to apply the release agent depend on the shape of the unvulcanized tire T or the kind of rubber material, it is possible to reduce the amount of the release agent which is applied to.

Also, on the outer surface of the bladder body 52, there are first air-release grooves 52a formed so as to extend from a tire-circumferential position to another tire-circumferential position and extend toward one side in the tire-width direction, and the second air-release grooves 52b formed so as to extend from a tire-circumferential position to another tire-circumferential position and extend toward the other side of the tire-width direction. Also, each of the second air-release grooves 52b is intersecting two or more first air-release grooves 52a. Thus, in the case in which the bladder body 52 is inflated and the outer surface of the bladder body 52 comes into pressure contact with the inner surface of the tire during vulcanization, air existing between each of the first air-release grooves 52a flows into each first air-release groove 52a via the second air-release grooves 52b. Therefore, discharging air between the bladder body 52 and the unvulcanized tire T is effectively performed.

Also, in this embodiment, the second interval L2 is a double distance of the first interval L1 (the second interval L2/the first interval L1=2.0). in this embodiment, Bladders each of which are set up so that the second interval L2 is 1.0, 5.0, 1.2, 2.0, 3.0, 4.5 times as much as the first interval L1 are made, and the tires made by using each of the said bladders 52 are experimented (refer to comparison examples 3, 4 and execution examples 1-4 in FIG. 7). Also, a bladder body 52 which is provided only with the first air-release grooves 52a without the second air-grooves 52b is made, and an comparison experiment is performed (refer to comparison examples 1, 2 in FIG. 7). The experiment is performed on automobile pneumatic tires having size 145R12-6PR.

By this, when each of the second air-release grooves 52b is not provided and the release agent is not applied, it occurs vulcanization failures as the comparison example 2 shows. On the other hand, when each of the second air-release grooves 52b is provided, and the second interval L2 is equal to or less than 4.5 times relative to the first interval L1, vulcanization failures do not occur without applying the release agent. In this embodiment, the tire failures is such that the outer surface of the bladder body 52 become adhered onto the inner surface of the vulcanized tire and a part of the inner surface of the tire remains on the bladder body 52. On the other hand, when the second interval L2 is equal or more than 5.0 times relative to the first interval L1 and the release agent is not applied, it occurs vulcanization failures.

According to the experiment result which shows whether the vulcanization failure occurs without the release agent, when the second interval L2 is equal to or more than 1.0 time and equal to or less than 4.5 times relative to the first interval L1, it is possible to achieve the same or similar result in which the second interval L2 is a double distance of the first interval L1.

Also, in the case in which the second air-release grooves 52b are provided and the release agent is not applied (refer to comparison examples 3, 4 and execution examples 1-4), when the second interval L2 is equal to or more than first interval L1, it is possible to prevent reduction of thickness of inner liner of the vulcanized tire, it is also possible to prevent reduction of internal pressure holding ability. In this embodiment, the internal pressure holding ability is experimented by attaching the vulcanized tire to the standard rim (12×4.00B) of JATMA, setting up the inner pressure of the tire to the maximal air pressure (350 kPa) of JATMA and leaving that as it is, performing the adjusting inner air pressure work for adjusting the inner pressure of the tire to the maximal air pressure every 24 hour, and measuring the inner pressure of the tire before the adjusting inner air pressure work when 14 days has passed. The results of the internal pressure holding ability is indexed so that the result of the comparison example 1 becomes 100. Also, the bigger the number of that data is, the better the internal pressure holding ability is.

According to the experiment result which shows whether the vulcanization failure occurs without applying the release agent, and according to the experiment result of the thickness of the inner liner and the internal pressure holding ability, when the second interval L2 is equal to or more than 1.2 times and equal to or less than 4.5 times relative to the first interval L1, it is possible to achieve the same or similar result in which the second interval L2 is a double distance of the first interval L1, and it is possible to improve the thickness of the inner liner and the internal pressure holding ability. Thus, it is extremely advantageous for manufacturing tubeless tires.

In this embodiment, it is preferable that the first interval L1 is equal to or more than 8.0 mm and equal to or less than 14.0 mm. Thus, when the first interval L1 is less than 8.0 mm, it is not preferable to maintain the thickness of the inner liner. When the first interval L1 is more than 14.0 mm, the effect of discharging air becomes low, and effect of preventing the adhering between the bladder body 52 and the tire becomes low.

Also, if pneumatic tires are vulcanized using the bladder body 52 with each of the first air-release grooves 52a and each of the second air-release grooves 52b provided on the outer surface of the bladder body 52 as mentioned above. Also, on the inner surface of the tire, a plurality of first penetrating portions and a plurality of second penetrating portions, which are respectively corresponding to each of the air-release grooves 52a, 52b on the outer surface of the bladder body 52, are formed. Thus, a plurality of first penetrating portions is provided on the inner surface of the tire, the first penetrating portions are arranged with intervals with each other in the tire-circumferential direction, each of the first penetrating portions is formed so as to extend from a tire-circumferential position to another tire-circumferential position and extend toward one side of the tire-width direction. Also, a plurality of second penetrating portions is provided on the inner surface of the tire, the second penetrating portions are arranged with intervals with each other in the tire-circumferential direction, each of the second penetrating portions is formed so as to extend from a tire-circumferential position to another tire-circumferential position and extend toward the other side of the tire-width direction. Also, each of the second protruding portions is intersecting two or more first protruding portions.

In this embodiment, the second air-release grooves 52b are extending from a vicinity of the equator line EL to a portion corresponding to the shoulder portion of the unvulcanized tire. On the other hand, it is possible to form the second air-release grooves so as to extend from a vicinity of the equator line EL to a vicinity of a portion which is supported by each of the support members 51. In this case, each of the second air-release grooves 52b is provided through an area corresponding to tread portion, shoulder portion, side portion, and bead portion of the unvulcanized tire T. Moreover, it is also possible to form each of the first air-release grooves 51a so as to extend from a vicinity of the equator line EL to a vicinity of a portion which is corresponding to the shoulder portion of the unvulcanized tire T.

Figure 8:
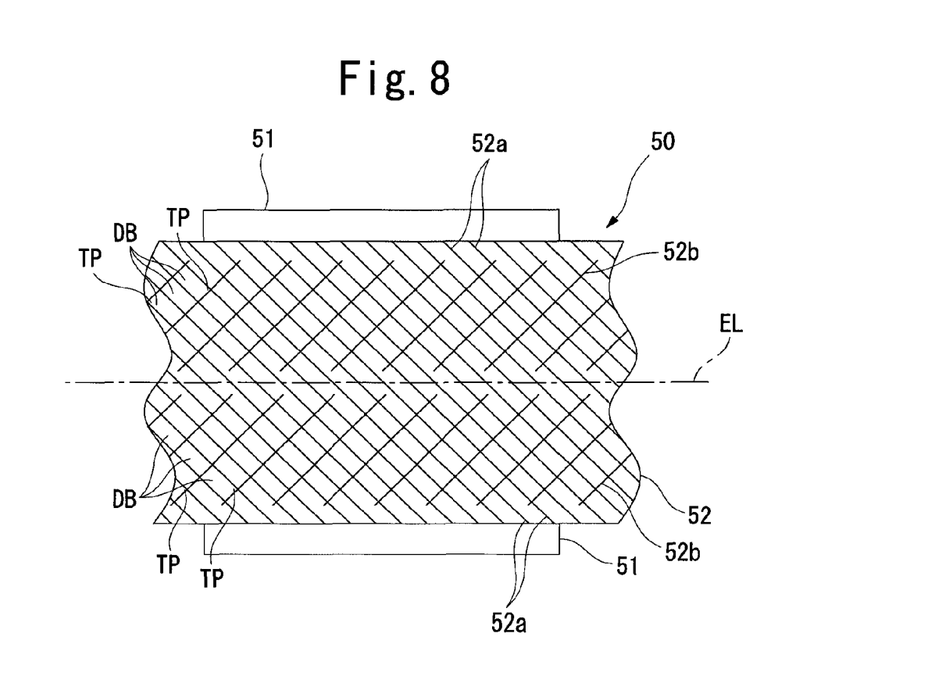
FIG. 8 is a side sectional view of a bladder for vulcanizing tires showing first modification example of the first embodiment.

Also, in this embodiment, a plurality of air-release grooves 52a, 52b is provided on one tire-width side on the bladder body 52 relative to the equator line EL and another plurality of air-release grooves 52a, 52b is provided on the other tire-with direction side on the bladder body 52 relative to the equator line EL. On the other hand, it is possible to connect each first air-release groove 52a on one tire-width side and each first air-release groove 52a on another tire-width side (refer to FIG. 8). Moreover, it is possible to connect each second air-release groove 52b on one tire-width side and each second air-release groove 52a on another tire-width side (not shown in drawings).

Figure 9:
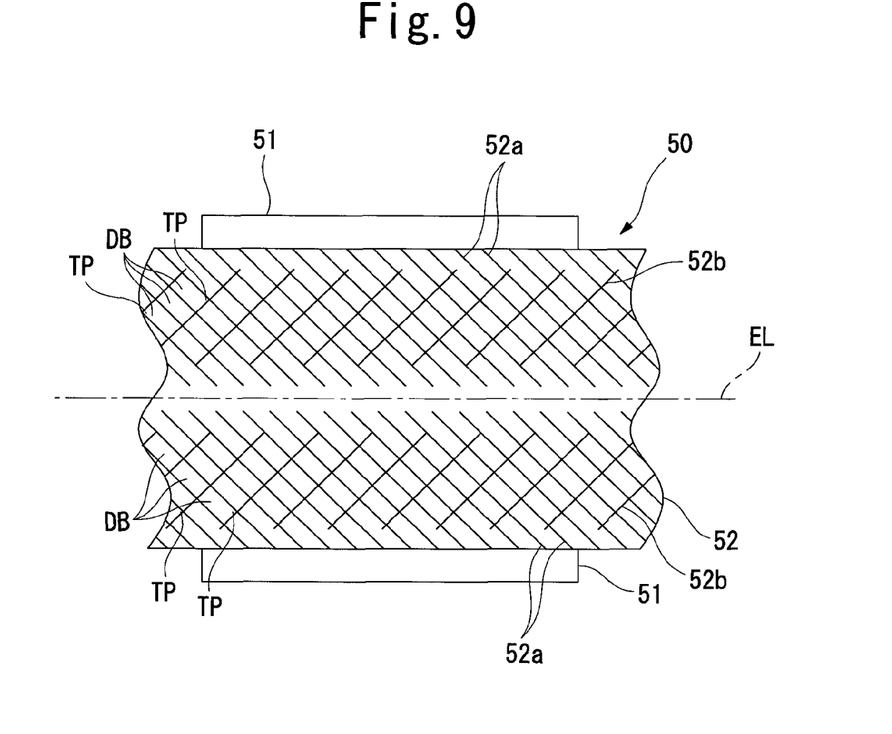
FIG. 9 is a side sectional view of a bladder for vulcanizing tires showing second modification example of the first embodiment.

In this embodiment, a distance between each first air-release groove 52a and the equator line EL is almost the same as a distance between each second air-release groove 52b and the equator line EL. On the other hand, it is possible that a distance between each second air-release grooves 52b and the equator line EL is larger than a distance between each first air-release grooves 52a and the equator line EL (refer to FIG. 9). Also, it is possible that a distance between each second air-release grooves 52b and the equator line EL is smaller than a distance between each first air-release grooves 52a and the equator line EL.

Figure 10:
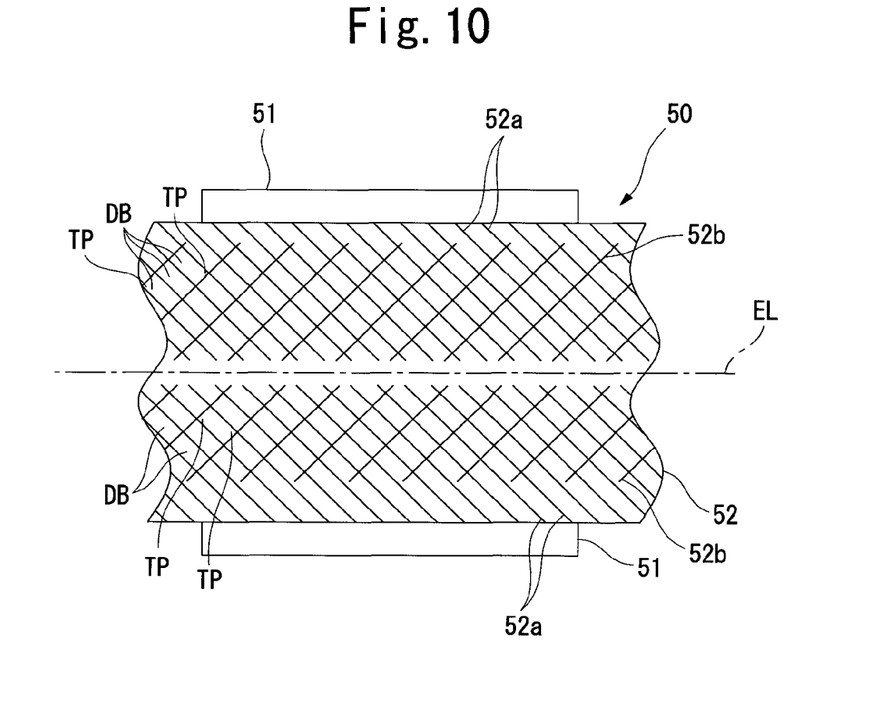
FIG. 10 is a side sectional view of a bladder for vulcanizing tires showing third modification example of the first embodiment.

In this embodiment, the air-release grooves 52a, 52b is provided so as to be symmetrical relative to the equator line EL. On the other hand, it is possible to provide each second air-release groove 52b so that each second air-release groove 52b on one tire-width side is longer than each second air-release groove 52b on the other tire-width side (refer to FIG. 10).

Figure 11:
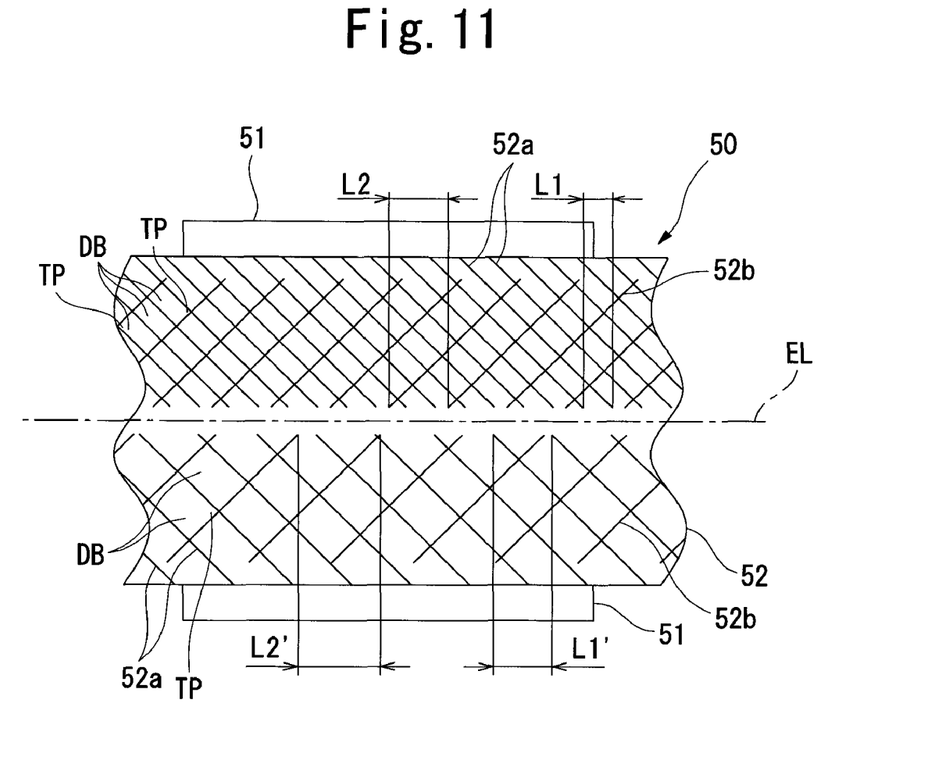
FIG. 11 is a side sectional view of a bladder for vulcanizing tires showing fourth modification example of the first embodiment.

Also, when the first air-release grooves 52a, which are on one tire-width side relative to the equator line EL, are arranged with first predetermined intervals L1 with each other in the tire-circumferential direction, and the first air-release grooves 52a, which are on the other tire-width side relative to the equator line EL, are arranged with other first predetermined intervals L1' with each other in the tire-circumferential direction, it is possible to make the other first predetermined interval L1' larger than the first predetermined interval L1 (refer to FIG. 11). In this case, the second air-release grooves 52b, which are on one tire-width side relative to the equator line EL, are arranged with second predetermined intervals L2 with each other in the tire-circumferential direction, and the second air-release grooves 52b, which are on the other tire-width side relative to the equator line EL, are arranged with other second predetermined intervals L2' with each other in the tire-circumferential direction. In this case, when the other second predetermined interval L2' is equal to or more than 1.0 times or 1.2 times and equal to or less than 4.5 times relative to the other first predetermined interval L1', it is possible to achieve the same or similar effect mentioned above.

Also, it is possible to from first air-release grooves 52a, which are disposed on one tire-width side relative to the equator line EL, so as to make the angle α relative to the equator line EL, and form first air-release grooves 52a, which are disposed on the other tire-width side relative to the equator line EL, so as to make another angle α' relative to the equator line EL. On the other hand, it is possible to from second air-release grooves 52b, which are disposed on one tire-width side relative to the equator line EL, so as to make the angle β relative to the equator line EL, and form second air-release grooves 52b, which are disposed on the other tire-width side relative to the equator line EL, so as to make another angle β' relative to the equator line EL. In this case, the angle α is different from the angle α', the angle β is different from the angle β'. In this case, it is possible to achieve the same or similar effect in which the air-release grooves 52a, 52b are disposed symmetrically relative to the equator line EL. In this case, it is preferable that the angles α, α', β, β', which are the angles between the air-release grooves 52a, 52b and the equator line EL, is equal to or more than 20° and equal to or less than 80°. If it is larger than 80°, the effect for preventing the adhering between the bladder body 52 and the tire becomes low. Also, if it is smaller than 20°, intervals between each of the first air-release grooves 52a or intervals between each of the second air-release grooves 52b become small, it is not preferable for ensuring the thickness of the inner liner member. In these cases, said angles α, α', β, β' are the angles which the air-release grooves 52a, 52b make relative to the equator line EL near the equator line EL. On the other hand, the outer surface of the bladder body 52 on which the air-release grooves 52a, 52b are provided is curved. Also, there can be a case in which the air-release grooves 52a, 52b are formed like straight lines, and there can be a case in which the air-release grooves 52a, 52b are formed like smooth curved lines. By this, except for the area which is near to the equator line EL, there is a case in which the angles between the air-release grooves 52a, 52b and the equator line EL do not become the angles α, α', β, β'.

Figure 12:
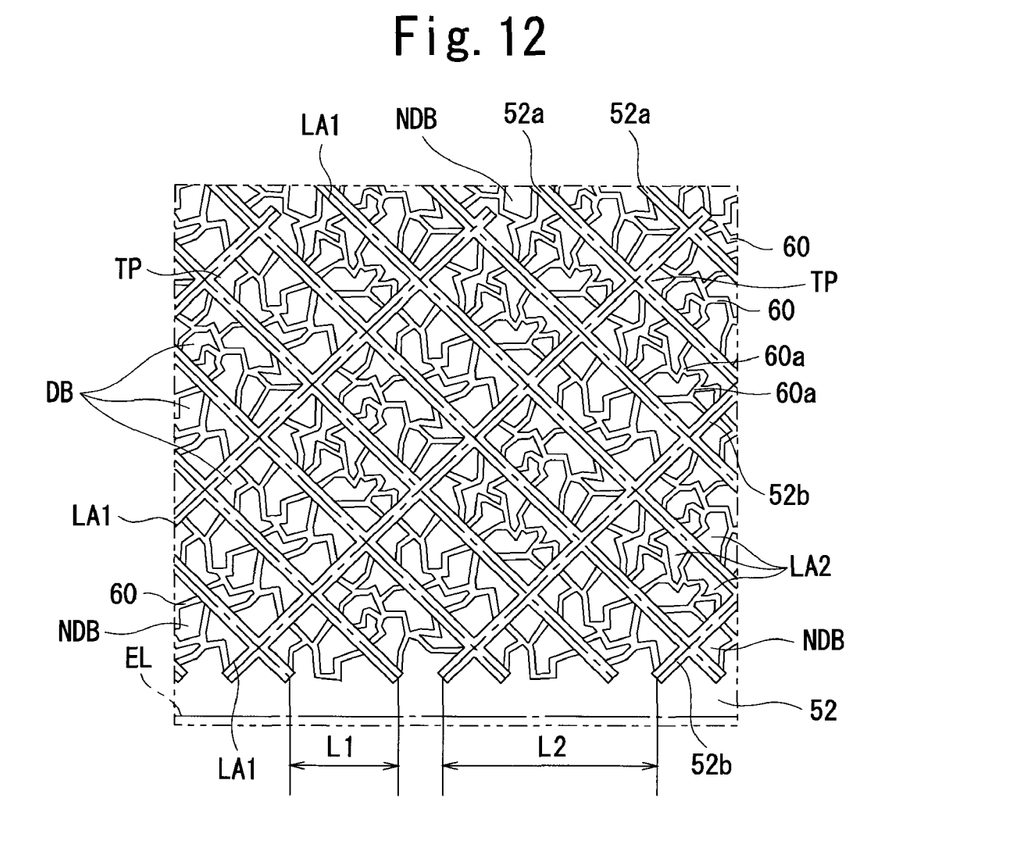
FIG. 12 is a partial sectional view of a bladder for vulcanizing tires showing a second embodiment of the present invention.
Figure 13:
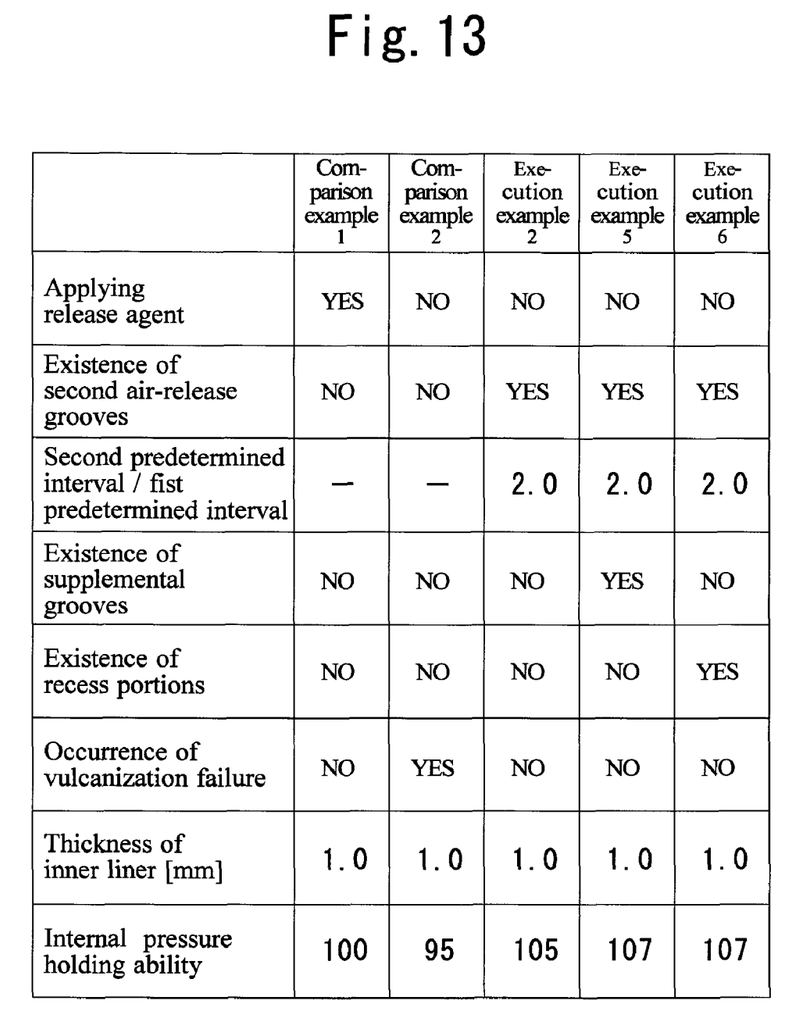
FIG. 13 is a table showing an experiment result.

FIGS. 12 to 13 show a second embodiment of the present invention. FIG. 12 is a partial sectional view of a bladder for vulcanizing tires, FIG. 13 is a table showing an experiment result. This embodiment is the one constructed by further adding a plurality of supplemental grooves 60 to the first embodiment. Therefore, the rest of the structure is the same with the first embodiment.

The supplemental grooves 60 are provided on land portions LA1 which are formed on the outer surface of the bladder body 52 by providing the first air-release grooves 52a and the second air-release grooves 52b. In this embodiment, as the land portions LA1, there are land portions (areas DB) which are fully divided by the air-release grooves 52a, 52b and there are land portions (open areas NDB) which are not fully divided by the air-release grooves 52a, 52b. The supplemental grooves 60 are surely provided on the said areas DB, and the supplemental grooves 60 are also provided on part of the said open areas NDB. The supplemental grooves 60 have not regular shapes, and have branching portions 60a. Also, by forming protrusion or recession on the surface of the vulcanizing mold for vulcanizing the bladder 52 by chemical or electrical melt etching, the supplemental grooves 60 are formed on the outer surface of the bladder body 52. Therefore, a plurality of supplemental land portions LA2 is provided on the outer surface of the bladder body 52 by the said air-release grooves 52a, 52b and supplemental grooves 60, and the supplemental grooves 60 have irregular shapes. Also, the width of supplemental grooves 60 is smaller than that of the air-release grooves 52a, 52b, the deepness of the supplemental grooves 60 is shallower than that of the air-release grooves 52a, 52b. The supplemental grooves 60 are formed so as to lead to at least one of the air-release grooves 52a, 52b.

The vulcanizing mold 1 and bladder 50 for vulcanizing tires having the aforementioned structure are used for vulcanizing the unvulcanized tires T as well as the first embodiment. Also, the bladder 50 for vulcanizing tires is taken out form the vulcanized tire, and the vulcanized tire is taken out from the vulcanizing mold 1.

In this embodiment, on the outer surface of the bladder body 52, there are air-release grooves 52a, 52b as mentioned in the first embodiment. Therefore, as described in the first embodiment, when the bladder 52 is taken out from the vulcanized tire, each vertex TP of each of the areas DB, which are formed by intersecting the first air-release grooves 52a and the second air-release grooves 52b, works as release starting point, adhering of the inner surface of the vulcanized tire and the outer surface of the bladder body 52 is prevented. Also, the supplemental grooves 60 are formed on the land portions LA1 which are formed on the outer surface of the bladder body 52 and formed by intersecting the first air-release grooves 52a and the second air-release grooves 52b. Also, the width and depth of the supplemental grooves 60 is smaller than those of air-release grooves 52a, 52b. Therefore, the effect to prevent adhering by means of air-release grooves 52a, 52b is not reduced by providing the supplemental grooves 60. Also, it is possible to reduce contact area between the inner surface of the tire and the outer surface of the bladder body 52. Therefore, adhering of the inner surface of the vulcanized tire and the outer surface of the bladder body 52 is more effectively prevented.

Also, each of the second air-release grooves 52b is intersecting two or more first air-release grooves 52a. Therefore, as described in the first embodiment, when the bladder body 52 is inflated and the outer surface of the bladder body 52 comes into contact with the inner surface of the unvulcanized tire T, air existing between each of the first air-release grooves 52a flows into the first air-release grooves 52a via the second air-release grooves 52b. Thus, discharging of air between the bladder body 52 and the unvulcanized tire T is performed efficiently. Moreover, the supplemental grooves 60 are provided on the land portions LA1 provided on the outer surface of the bladder body 52 by the air-release grooves 52a, 52b, the supplemental grooves 60 are formed so as to lead to either of the air-release grooves 52a, 52b. Therefore, discharging of air between the bladder body 52 and the unvulcanized tire T is performed more efficiently.

In this embodiment, it is preferable that the width of the supplemental grooves 60 is equal to or more than 0.15 times and equal to or less than 0.60 times relative to that of the larger one of the air-release grooves 52a, 52b. Also, it is preferable that the depth of the supplemental grooves 60 is equal to or more than 0.35 times and equal to or less than 0.75 times relative to that of the larger one of the air-release grooves 52a, 52b. When the width of the supplemental grooves 60 is smaller than the said 0.15 times, or the depth of the supplemental grooves 60 is smaller than the said 0.35 times, effect of the supplemental grooves 60 for discharging air between the outer surface of the bladder body 52 and the inner surface of the unvulcanized tire T is reduced. Also, when the width of the supplemental grooves 60 is larger than the said 0.60 times, or the depth of the supplemental grooves 60 is larger than the said 0.75 times, the amount of the inner liner member of the unvulcanized tire T, which flow into the supplemental grooves 60, is increased. Therefore, it is not preferable for making the thickness of the inner liner member uniformly.

The width and the depth of the air-release grooves 52a, 52b are dimensions which are defined by averaging measurement results at the several portions (more than three points). For example, the width of the first air-release groove 52a is defined by measuring widths at both ends and the middle thereof in the longitudinal direction, and then averaging the measurement results. Moreover, when each width of each first air-release grooves 52a is different with each other, the width of the first air-release groove 52a is defined by defining the several first air-release grooves 52a, and then averaging the defined widths of the first several air-release grooves 52a. On the other hand, the width of the supplemental grooves 60 is defined by measuring widths at several portions (more than three points) except brunching portions 60a, and then averaging the measurement results.

Figure 14:
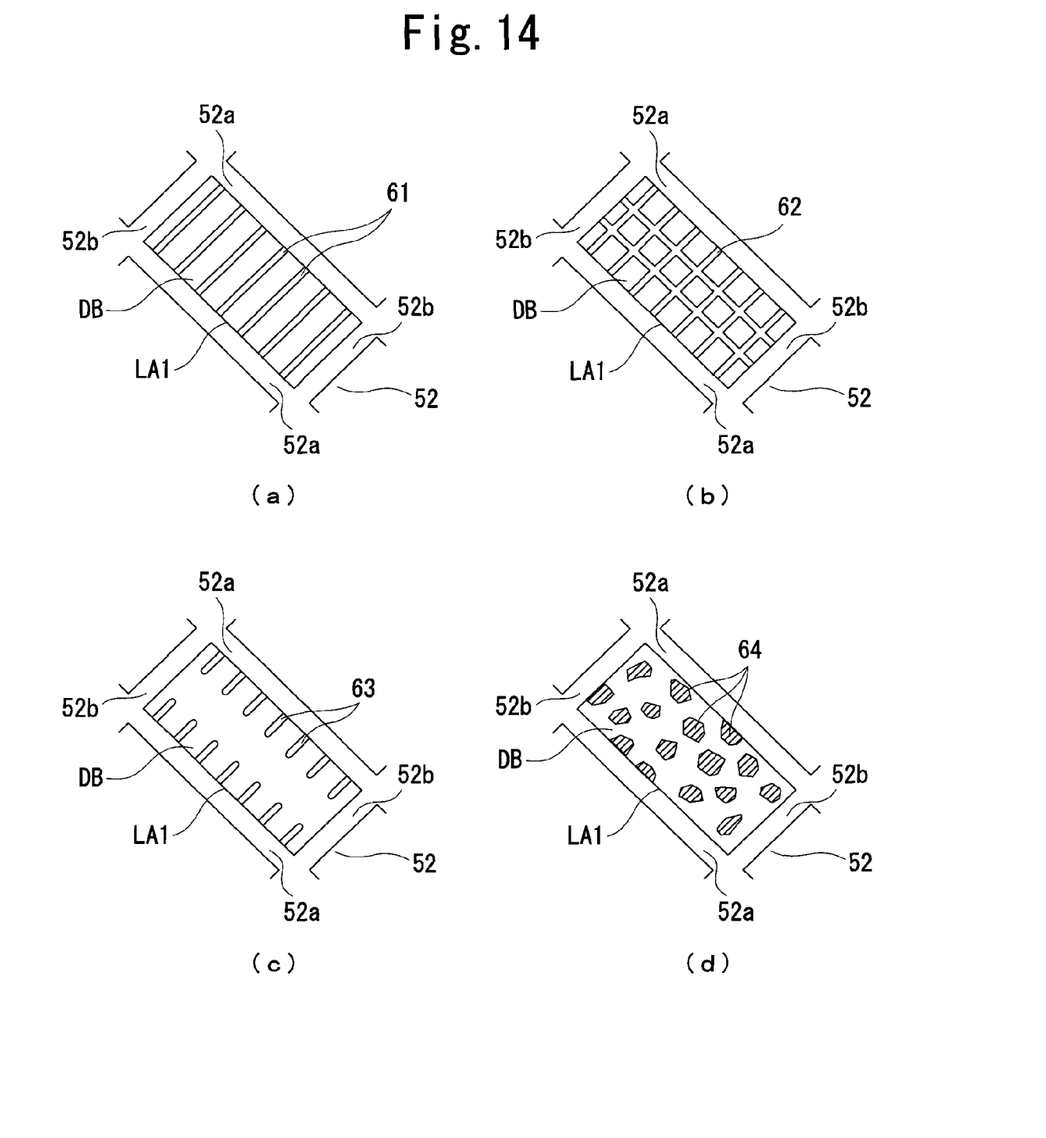
FIG. 14 is a partial sectional view of a bladder for vulcanizing tires showing a modification example.

Also, in the second embodiment, the supplemental grooves 60 having no regularity shapes is provided. On the other hand, as shown in FIG. 14(a), it is possible to provide supplemental grooves 61 instead of the supplemental grooves 60, and to constitute the supplemental grooves 61 with a plurality of straight-line-like grooves which are provided so as to be arranged in parallel with each other. In this case, it is possible to voluntarily set the direction which the supplemental grooves 61 extend. Also, as shown in FIG. 14(b), it is possible to provide grid-like shape supplemental grooves 62. Also, as shown in 14(c), it is possible to provide supplemental grooves 63 constituted with grooves which lead only to the first air-release grooves 52a, it is also possible to provide supplemental grooves (not shown in drawings) constituted with grooves which lead only to the second air-release grooves 52b. In the cases of FIGS. 14(a), 14(b), and 14(c), if the width and depth of the supplemental grooves 61, 62, 63 are set within the aforementioned amount indicated as for the supplemental grooves 60, it is possible to reduce contact area between the inner surface of the tire and the outer surface of the bladder body 52 by the supplemental grooves 61, 62, 63. Also, it is advantageous for discharging air between the bladder body 52 and the unvulcanized tire T.

Moreover, as shown in FIG. 14(d), on the land portions LA1 which are formed on the outer surface of the bladder body 52 by providing the first air-release grooves 52a and the second air-release grooves 52b, it is possible to provide a plurality of recess portions 64 (shaded portion) instead of the supplemental grooves 60. In this case, it is also possible to reduce contact area between the inner surface of the tire and the outer surface of the bladder body 52 by the recess portions 64. Also, it is advantageous for discharging air between the bladder body 52 and the unvulcanized tire T (refer to the execution example 6 in FIG. 13).

Moreover, it is preferable that area where the recess portions 64 are provided is equal to or more than 0.1 times and equal to or less than 0.3 times relative to area of the land portions LA1. Also, it is preferable that the depth of each of the recess portions 64 is equal to or more than 0.35 times and equal to or less than 0.75 times relative to the depth of one of the air release grooves 52a, 52b having deeper depth than the other one. If area where the recess portions 64 are provided is less than the said 0.1 times or the depth of each of the recess portions 64 is less than the said 0.35 times, the effect for preventing the adhering of the inner surface of the tire and the outer surface of the bladder body 52 is reduced. Also, if area where the recess portions 64 are provided is more than the said 0.3 times or the depth of each of the recess portions 64 is more than the said 0.75 times, the amount of the inner liner member of the unvulcanized tire T, which flow into the supplemental grooves 60 during vulcanization, is increased. Therefore, it is not preferable for making the thickness of the inner liner member uniformly.

In the first and second embodiment, the unvulcanized tires T which become to pneumatic tires for automobile are vulcanized. On the other hand, when pneumatic tires for aircraft or others are vulcanized by using the present embodiments, it is also possible to achieve an effect which is the same or similar to the aforementioned.

Also, in the first and second embodiment, the unvulcanized tires T are vulcanized by the vulcanizing mold 1 and the bladder 50 for vulcanizing tires having the upper mold 10, lower mold 20, middle mold 30, and bead ling 40. On the other hand, it is possible to use a vulcanizing mold having another structure instead of the vulcanizing mold 1, and it is possible to achieve an effect which is the same or similar to the aforementioned.

The preferred embodiments described in this specification are illustrative and not restrictive. The scope of invention is given by the appended claims, and all changes and modifications included in the meaning of claims are embraced in the present invention.

The invention claimed is:

1. A bladder for vulcanization of tires, comprising:
a bladder body made from a flexible material, the bladder body which is disposed inside an unvulcanized tire in a vulcanizing mold during vulcanization and expands so that the unvulcanized tire becomes pressure contact with the inner surface of the vulcanizing mold;
a plurality of first air-release grooves provided on the outer surface of the bladder body and arranged with first predetermined intervals with each other in the tire-circumferential direction, each of the first air-release grooves formed so as to extend from one to the other of the tire circumferential direction and extend toward one side of the tire-width direction; and
a plurality of second air-release grooves provided on the outer surface of the bladder body and arranged with second predetermined intervals with each other in the tire-circumferential direction, the second interval is a distance equal to or more than 1.2 times and equal to or less than 4.5 times relative to the first interval, each of the second air-release grooves formed so as to extend from one to the other of the tire circumferential direction and extend toward the other side of the tire-width direction, each of the second air-release grooves intersecting two or more first air-release grooves.

2. The bladder for vulcanization of tires according to claim 1, wherein
a plurality of land portions is provided on the outer surface of the bladder body by forming said first air-release grooves and said second air-release grooves,
a plurality of supplemental grooves is provided on each of the land portions, and the width and the depth of the supplemental grooves are smaller than the width and the depth of the air-release grooves.

3. The bladder for vulcanization of tires according to claim 2, wherein
the supplemental grooves are formed so as to lead to one of the air-release grooves.

4. The bladder for vulcanization of tires according to claim 3, wherein
a plurality of supplemental land portions having no regularity shapes is formed on the outer surface of the bladder body by providing said air-release grooves and said supplemental grooves.

5. The bladder for vulcanization of tires according to claim 1, wherein
a plurality of land portions are provided on the outer surface of the bladder body by forming said first air-release grooves and said second air-release grooves, and a plurality of recess portions is provided on each of the land portions.

6. The bladder for vulcanization of tires according to claim 1, wherein
said first predetermined interval is equal to or more than 8 mm and equal to or less than 14 mm.

7. A method for forming pneumatic tires by vulcanizing unvulcanized tires, the method comprising a step of
placing the unvulcanized tire in the vulcanizing mold, and then placing inside the unvulcanized tire the bladder body of the bladder for vulcanizing tires described in claim 1, and then inflating the bladder body so that the unvulcanized tire becomes pressure contact with the inner surface of the vulcanizing mold.

* * * * *